June 12, 1928.  C. NIELSEN  1,673,155
MIXING MACHINE
Filed April 30, 1927
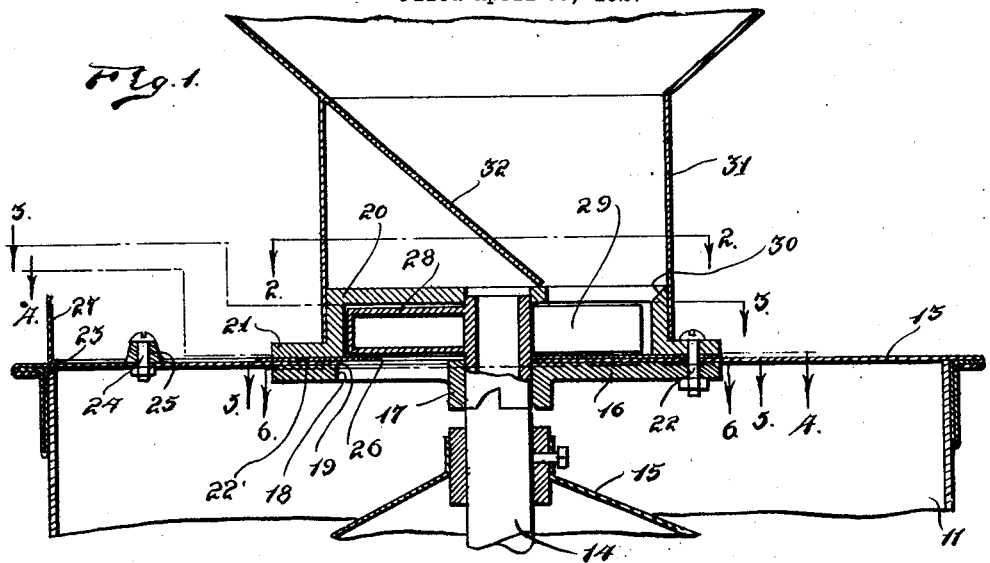
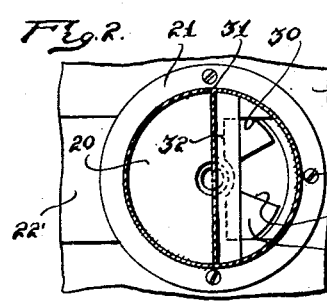
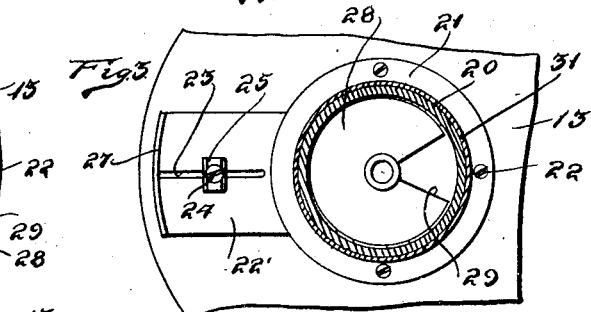
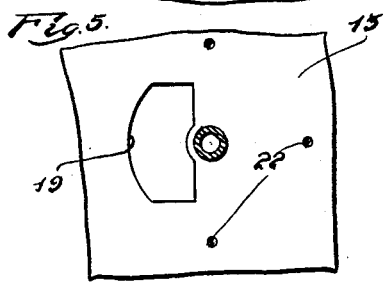
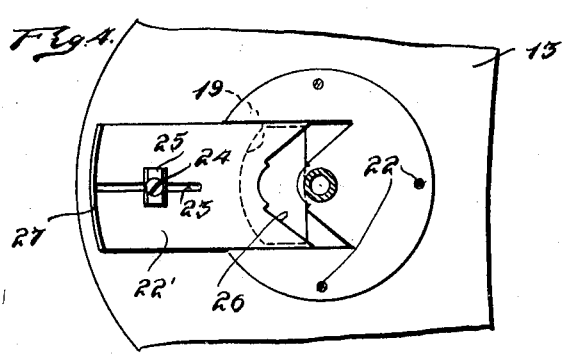
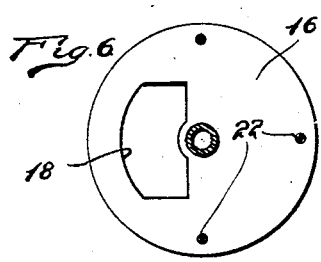
INVENTOR.
Claudius Nielsen.
BY
ATTORNEY.

Patented June 12, 1928.

1,673,155

UNITED STATES PATENT OFFICE.

CLAUDIUS NIELSEN, OF DETROIT, MICHIGAN.

MIXING MACHINE.

Application filed April 30, 1927. Serial No. 187,776.

My invention relates to a new and useful improvement in a mixing machine and is an improvement over the invention disclosed in my co-pending application, Serial Number 175,078.

The present invention has particular reference to the structure of the feeding mechanism whereby the material is fed into the tank containing the liquid. It is an object of the present invention to provide a feeding member which will deliver the material to be mixed with the liquid to the tank in predetermined amounts, the feeding of the material to the tank being effected while a rotatable shaft is being rotated.

Another object of the invention is the provision of a rotatable disc provided with a recess or notch formed therein for receiving and delivering a predetermined amount of the material to the mixing tank, the disc portion between the notches and recesses serving as a closure for closing the hopper or container in which the material is placed.

Other objects will appear hereinafter.

The invention consists in the combination and arrangement of parts hereinafter described and claimed.

The invention will be best understood from a reference to the accompanying drawings which form a part of this specification and in which, Fig. 1 is a fragmentary vertical sectional view of a mixing machine embodying the invention.

Fig. 2 is a fragmentary sectional view taken on substantially line 2—2 of Fig. 1.

Fig. 3 is a fragmentary sectional view taken on substantially line 3—3 of Fig. 1.

Fig. 4 is a fragmentary sectional view taken on substantially line 4—4 of Fig. 1.

Fig. 5 is a fragmentary sectional view taken on substantially line 5—5 of Fig. 1.

Fig. 6 is a sectional view taken on substantially line 6—6 of Fig. 1.

As shown in the drawings there is used with the invention a tank or container 11 into which liquid is delivered, this container having a cover 13. A shaft 14 extends centrally of the container 11 and is rotated by a suitable source of power. A conical shield 15 is mounted on the shaft 14.

Secured to the under surface of the cover 13 is a disc 16 having a flange 17 projecting centrally therefrom at the lower face thereof to provide a bearing for the shaft 14. This disc 16 is provided with the cutaway portion 18 which registers with an opening 19 formed in the cover 13. Mounted on the upper surface of the cover 13 is a cup shaped member 20 having a peripheral flange 21 through which bolts 22 are projected to secure the cup shaped memer 20 and the disc 16 in position on the cover 13. A regulating plate 22′ is provided with an elongated slot 23 and positioned in engagement with the upper face of the cover 13, a bolt 24 projecting through the slot 23 and being provided with a clip 25 which straddles the slot 23. The inner end of this regulating plate 22′ is notched out as at 26, the opposite end of the plate being angularly turned upwardly to provide a gripping portion 27. This plate is positioned on the cover 13 in such a location that its inward movement will serve to close the openings 18 and 19 and thus regulate the area of the opening which may be in communication with the cup shaped member 20. Fixedly mounted upon the shaft 14 and positioned within the cup shaped member 20 is a disc 28 which is designed to substantially fill the cup shaped member 20. Formed in the disc 28 is a notch 29. The cup shaped member 20 is provided with an opening 30 which communicates with the interior of the hopper 31 mounted on the cup shaped member 20 in embracing relation. A deflecting plate 32 is mounted in the hopper so as to direct the cleaning compound or other material placed in the hopper toward the opening 30.

It is generally intended to place in the hopper a cleaning compound in a powdered form. The material placed in the hopper will always be of a loose nature so that its feeding downwardly in the hopper to the opening 30 will be easily effected.

In operation the rotation of the shaft 14 will effect a rotation of the disc 28 and as the disc 28 is brought into position so that the notch 29 registers with the opening 30 the notch 29 will fill with the material flowing from the hopper 31 and serve to carry it over the openings 19 and 18 through which the material will, by gravity, be deposited in the tank 11. By moving the regulating plate 22 inwardly or outwardly the amount of material passing into the tank 11 from the notch 29 will be regulated. It is believed evident that the disc 28 will serve as a closure for the opening 30 at all times except when the notch 29 is brought into registration therewith.

It is obvious that the size of the notch 29 may be varied and if desired more than one notch provided in the disc 28. Experience has shown, however, that a single notch is quite ample for ordinary purposes.

While I have illustrated and described the preferred form of my invention, I do not wish to limit myself to the precise details of structure shown, but desire to avail myself of such variations and modifications as come within the scope of the appended claims.

Having thus described my invention what I claim as new and desire to secure by Letters Patent is:

1. In a mixing machine of the class described a tank having an inlet opening formed therein; a cup shaped member positioned over said inlet opening and having an opening formed therein out of registration with said inlet opening; a hopper extending above from and embracing said cup shaped member and communicating with the opening formed therein; a rotatable closure mounted in said cup shaped member and extending over both of said openings, said closure having a portion cut away for the reception, upon the registration of said cutaway portion with the opening in said cup shaped member, of material from said hopper, said closure being adapted upon its rotation for conveying said material to said inlet opening.

2. In a mixing machine of the class described a tank having an inlet opening formed therein; a cup shaped member positioned over said inlet opening and having an opening formed therein out of registration with said inlet opening; a hopper extending above from and embracing said cup shaped member and communicating with the opening formed therein; and a disc rotatably mounted in said cup shaped member and serving as a closure for the opening therein and extending over said inlet opening and provided with a cutaway portion for the reception, upon the registration of said cutaway portion with the opening in said cup shaped member, of material from said hopper, said closure being adapted upon its rotation for conveying said material to said inlet opening.

3. In a mixing machine of the class described, a tank; a cover on said tank having an inlet opening formed therein; a disc mounted on the undersurface of said cover and having an opening registering with the opening in said cover; a cup-shaped member mounted on the outer surface of said cover, and positioned over said inlet opening and having an opening formed therein out of registration with said inlet opening; a hopper embracing at its lower edges said cup-shaped member and extending upwardly therefrom; a disc rotatably mounted in said cup-shaped member and substantially filling the same and serving as a closure for the opening therein and extending over said inlet opening and provided with a cut away portion for the reception, upon the registration of said cut away portion with the opening in said cup-shaped member, of material from said hopper, said closure being adapted upon its rotation for conveying said material to said inlet opening.

In testimony whereof I have signed the foregoing specification.

CLAUDIUS NIELSEN.